United States Patent
Mastro

(10) Patent No.: US 6,921,449 B2
(45) Date of Patent: Jul. 26, 2005

(54) CONTINUOUS SPIRAL PROCESS FOR MANUFACTURING IMAGEABLE SEAMED BELTS FOR PRINTERS

(75) Inventor: Paul F. Mastro, Little Rock, AR (US)

(73) Assignee: Xerox Corporation, Stamford, CT (US)

(*) Notice: Subject to any disclaimer, the term of this patent is extended or adjusted under 35 U.S.C. 154(b) by 345 days.

(21) Appl. No.: 10/215,491

(22) Filed: Aug. 8, 2002

(65) Prior Publication Data
US 2004/0026010 A1 Feb. 12, 2004

(51) Int. Cl.[7] .................................................. B31C 1/00
(52) U.S. Cl. ...................... 156/187; 156/137; 156/203; 156/184; 156/195; 156/193; 156/218; 156/258; 156/269
(58) Field of Search ............................... 156/218, 137, 156/203, 271, 304.5, 211, 184–195; 83/13, 343, 914, 674

(56) References Cited

U.S. PATENT DOCUMENTS

| | | | |
|---|---|---|---|
| 5,798,013 A | * | 8/1998 | Brandenburger ............ 156/188 |
| 5,944,930 A | * | 8/1999 | Takeuchi et al. ............ 156/218 |
| 6,217,964 B1 | * | 4/2001 | Ndebi et al. ............. 428/36.91 |
| 6,318,223 B1 | | 11/2001 | Yu et al. |
| 6,358,347 B1 | * | 3/2002 | Thornton et al. ........... 156/137 |

* cited by examiner

*Primary Examiner*—Jeff H. Aftergut
*Assistant Examiner*—Chris Schatz

(57) ABSTRACT

A method of manufacturing on a continuous basis quantities of seamed belts with imageable seams for printing systems from a continuous supply web of belt material, which seamed belts need to be manufactured to a desired circumference and width. In the disclosed embodiment the sides of the incoming supply web are cut in seam-forming mating edges and the web is fed in at an angle to a pair of rollers, at least one of which is tapered, to spirally wrap the web into a cylinder of the desired circumference of the seamed belts and providing mating engagement and gluing of the seam-forming edges. Then by sequentially transversely cutting off cylindrical segments of that spirally formed cylinder into the desired width, multiple seamed belts are formed with both the desired circumference and width.

1 Claim, 3 Drawing Sheets

CONTINUOUS SPIRAL PROCESS FOR MANUFACTURING IMAGEABLE SEAMED BELTS FOR PRINTERS

Disclosed in the embodiments herein is an improved, simple, low cost, process and system for the continuous manufacturing of multiple seamed belts from sequential portions of a web supply of suitable belt material, continuously provided with mating edges and spirally formed into a cylinder and cut off into multiple endless loop belts of a desired width, as opposed to an interrupted and/or separate manual operation of forming such belts from lengths of such material in the elongate dimension and direction of movement of such a web.

Heretofore, most of the endless belts for intermediate image transfer belts or photoreceptor belts for xerographic printers or the like have been expensively made without any seam by individual electroforming or the like, to allow continuous and non-synchronized image formation and/or transport around the entire belt circumference; or, made with seams which cannot be imaged over, thus requiring synchronized seam-skipping skipped-pitch systems, which reduce the effective printing rate. Thus, a long-term goal in this art, as described in some of the references cited below, is to be able to provide a belt which will have the lower manufacturing cost of a seamed belt, yet have a belt seam which can be imaged over substantially as if there were no seam, thus allowing the seamed belt to handle continuously closely spaced non-synchronized images extending around the entire belt circumference like a seamless belt.

With reference to the below-cited patents, a prior small batch processing method or system of making a seamed belt having a so-called "puzzle cut" seam is to make each belt individually starting with an blank planar sheet of suitable belt material of a suitable length for the desired belt circumference, and to puzzle-cut the opposite ends thereof, one at a time, with an expensive puzzle-cutting die extending across the width of the belt. (Thus, requiring the belt blank to be aligned twice with this elongated die.) This small batch processing method is not suitable for large scale low cost manufacturing.

In contrast, in the disclosed embodiment herein, production of multiple such belts may be provided in a continuous and more automatic manner at lower cost. A continuous web of belt material of uncritical width may be fed from a large roll supply and continuously simultaneously puzzle-cut on both opposing edges of that web (which web need not have the width of the final belts) by stationary, laser (or rotary mechanical) puzzle-cutting stations, and those opposing edges of the belt automatically brought together in a spiral formation with their opposing puzzle-cuts mating (interdigitated) together, in a spiral pattern, and then the mated seam may be cemented and coated or otherwise treated, and the resulting belts cut (before or after) to their desired width with intermittent operation of a simple linear transverse or circumferential laser or mechanical cutting or chopping system, which may also be a laser cutter. Variable belt circumferences may also be provided. In the disclosed embodiment, a large number of angularly imageable seamed belts may be continuously automatically produced from a continuously fed web of suitable supply material.

By way of background on imageable seamed belts, for intermediate image transfer belts or photoreceptor (PR) belts, for xerographic printers, and especially such seamed belts having so-called "puzzle cut" seams, and suitable materials therefor, there is noted, for example the following Xerox Corp U.S. Pat. No. 5,487,707, by Lucille M. Sharf, et al., filed Aug. 29, 1994 and issued Jan. 30, 1996 entitled "Puzzle Cut Seamed Belt With Bonding Between Adjacent Surface By UV Cured Adhesive"; U.S. Pat. No. 5,514,436 by Edward L. Schlueter, Jr., issued May 7, 1996, entitled "Puzzle Cut Seamed Belt"; U.S. Pat. No. 5,549,193, issued Aug. 27, 1996 entitled "Endless Seamed Belt with Low Thickness Differential Between the Seam and the Rest of the Belt"; U.S. Pat. No. 5,997,974 issued Dec. 7, 1999 by Ed Schlueter, et al.; and U.S. Pat. No. 6,311,595.

The following patents are particularly noted by way of some recent examples of Xerox Corp. U.S. patents with disclosures of interest as to manufacturing of the subject belts, and for other such art cited therein: U.S. Pat. No. 6,358,347, issued Mar. 19, 2002 to Constance J. Thornton, et al; and U.S. Pat. No. 6,318,223, issued Nov. 20, 2001 to Robert C. U. Yu, et al. The former discloses another continuous process of forming, from a supply of belt material, plural endless web belt loops of image bearing material being mated with puzzle-cut edge seams on a mandrel. The latter is another example of, inter alia, using excimer laser beam cutting of the mating puzzle-cut ends of such belt material. Other patents relating to this subject matter may be seen from these patents.

Although the present system is particularly suited for manufacturing such imageable seam belts for printers, especially, intermediate image transfer belts for electrophotographic printing systems, it is not limited thereto.

Further by way of background as to intermediate image transfer belts for electrophotographic printing systems, in operation, an intermediate transfer belt is typically brought into contact with a toner image-bearing member such as a photoreceptor belt with a previously exposed and developed latent image. In the contact zone an electrostatic field generating device such as a corotron, a bias transfer roller, a bias blade, or the like, creates electrostatic fields that transfer each toner image onto the intermediate transfer belt, which moves to carry that toner image on the intermediate transfer belt over into contact with a receiver, such as a copy sheet or other image substrate. A similar electrostatic field generating device may then transfers the toner image from the intermediate transfer belt to the receiver. Depending on the system, a receiver can be another intermediate transfer member or the image substrate onto which the toner will eventually be fixed. In either case the control of the electrostatic fields in and near the transfer zone is a significant factor in toner transfer.

As shown in the above-cited and other art, intermediate transfer belts may take the form of seamed belts fabricated by fastening two ends of a web material together, such as by welding, sewing, wiring, stapling, or gluing. While effectively seamless intermediate transfer belts are also desirable, they require manufacturing processes that make them much more expensive than similar seamed intermediate transfer belts. While seamed intermediate transfer belts are relatively lower in cost, the seam introduces a discontinuity that interferes with the electrical, thermal, and mechanical properties of the belt. While it is possible to synchronize a printer's operation with the motion of the intermediate transfer belt such that toner is not electrostatically transferred onto the seam, such synchronization adds to the printer's expense and complexity, and results in loss of productivity. Additionally, since some high speed electrophotographic printers produce images on paper sheets that are then cut from a continuous paper "web," if a belt seam must be avoided, the resulting unused portion of the paper web may have to be cut out, producing paper waste. Furthermore, even with synchronization, mechanical problems related to the discontinuity, such as excessive cleaner wear and/or mechanical vibrations, may still exist.

Acceptable intermediate transfer belts require sufficient seam strength to achieve a desired operating life. While the desired operating life depends on the specific application, typically it will be at least 100,000 operating cycles, and preferably 1,000,000 cycles. Considering that a seamed intermediate transfer belt suffers mechanical stresses from belt tension, traveling over rollers, moving through transfer nips, and passing through cleaning systems, achieving such a long operating life is not trivial. Seam failures can cause part of the belt to lift up at the seam and damage other printer components. Thus the conflicting constraints of long life and limited topographical size at the seam places a premium on adhesive strength and good seam construction.

A "puzzle cut" approach to seamed intermediate transfer belts, such as taught in the above-cited and other prior art references, significantly reduces mechanical problems by producing an improved mechanical seam. Those references also discuss other difficulties in manufacturing a suitable belt for transferring toner images without visible defects onto and off of a seam of a seamed intermediate transfer belt, especially, suitable electrical properties. Yet producing endless belts formed with puzzle-cut mating seams presents increased manufacturing difficulties.

A specific feature of the specific embodiment disclosed herein is to provide an improved method of manufacturing large quantities of seamed belts with imageable seams for printing systems, a method of manufacturing on a continuous basis quantities of seamed belts with imageable seams for printing systems from a continuous supply web of belt material, which seamed belts are manufactured to a desired predetermined defined circumference and a desired predetermined defined width, comprising forming the opposing side edges of said continuous supply web of belt material into seam-forming mating engagement edges, spirally wrapping said continuous web of belt material into a cylinder of a circumference corresponding to said predetermined defined circumference of said seamed belts and with mating engagement of said seam-forming mating engagement edges and sequentially transversely cutting off cylindrical segments of said spirally formed cylinder of said belt material into a width corresponding to said desired predetermined defined width of said manufactured seamed belts, to form said seamed belts with said desired predetermined defined circumference and said desired predetermined defined width.

Further specific features disclosed herein, individually or in combination, include those wherein said adhesively sealing said belt seams along said seam-forming mating engagement edges while said belt material is in said spirally wrapped cylinder, and/or wherein said forming of said opposing side edges of said continuous supply web of belt material into seam-forming mating engagement edges comprises laser cutting said opposing side edges of said continuous web of belt material in a mating pattern, and/or wherein said spiral wrapping of said continuous web of belt material into a cylinder of a circumference corresponding to said predetermined defined circumference of said seamed belts comprises feeding said continuous web of belt material at an angle into a pair of rollers, at least one of which is tapered.

As to specific components of the subject apparatus, or alternatives therefor, it will be appreciated that, as is normally the case, some such components are known per se in other apparatus or applications which may be additionally or alternatively used herein, including those from art cited herein. All references cited in this specification, and their references, are incorporated by reference herein where appropriate for appropriate teachings of additional or alternative details, features, and/or technical background. What is well known to those skilled in the art need not be described here.

Various of the above-mentioned and further features and advantages will be apparent from the specific apparatus and its operation described in the examples below, and the claims. Thus, the present invention will be better understood from this description of specific embodiments, including the drawing figures (approximately to scale) wherein:

Figure 3:
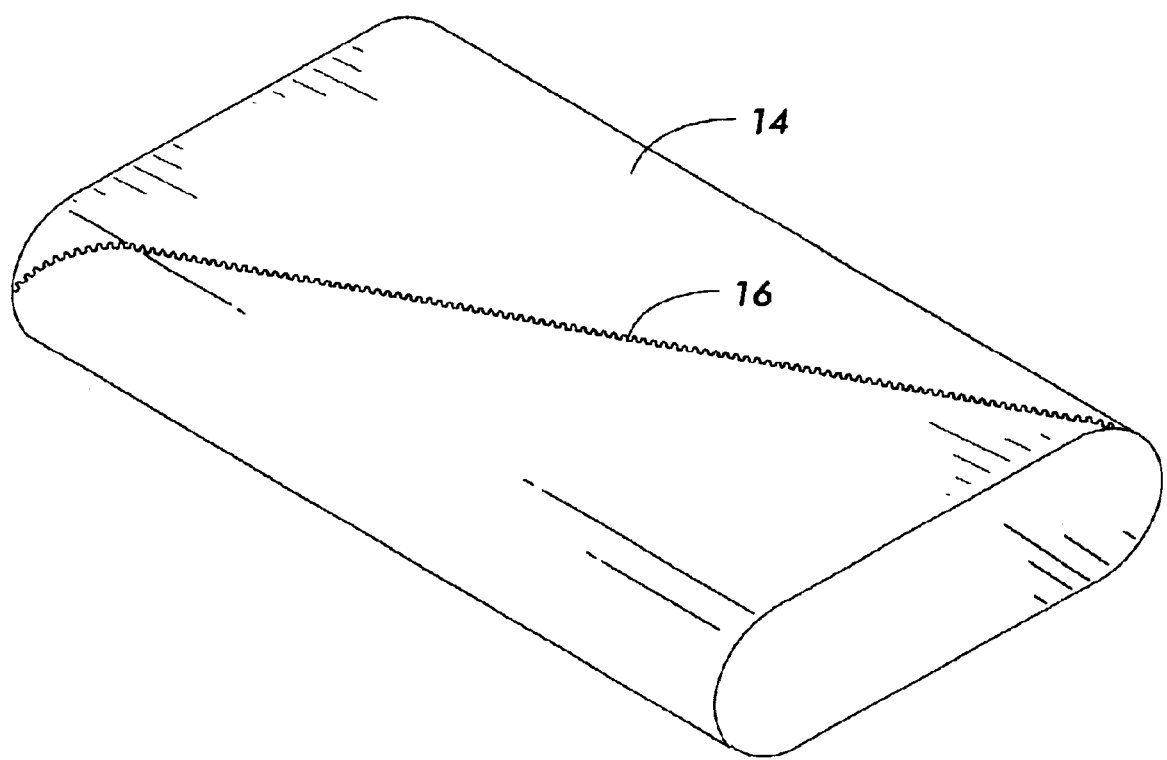
FIG. 3 shows an example of a single such finished belt made by the process shown in FIGS. 1 and 2.

Referring to the Figs, there is shown one example of a seamed belt manufacturing system 10 providing an apparatus and method for the production from a roll or other long supply web 12 of belt material of multiple imagable endless finished loop belts 14 (one of which is shown in FIG. 3) with puzzle-cut interlocked seams 16, in a more continuous and automatic manner and at lower cost.

Disclosed in this embodiment 10 example is an improved method of manufacturing on a continuous basis large quantities of seamed belts 14 with imageable seams 16 for printing systems, from a continuous supply web of belt material, which seamed belts can be variably manufactured to a desired circumference and width. In this disclosed embodiment the sides of the incoming supply web are cut in seam-forming mating edges and the web is then fed in at an angle to a pair of rollers, at least one of which is tapered, to spirally wrap the web into a cylinder of the desired circumference of the seamed belts and provide mating engagement and gluing of the seam-forming edges. Then by sequentially transversely cutting off cylindrical segments of that spirally formed cylinder into the desired width, multiple individual seamed belts 14 may be formed, all with both the desired circumference and the desired width.

The disclosed embodiment provides for the continuous production of multiple endless loop belts 14, even those with puzzle-cut interlocked seams 16, of variable diameter and/or width. It may be seen that this concept appears, in part, superficially somewhat similar to the appearance of the central cardboard mounting tubes for paper kitchen towels or toilet paper, which form a spiral path along the long axis of a paper web wrapped and glued into a moving cylindrical tube and cut into tubular segments. However, the latter, among various obvious other distinctions, retains plural spirals of visible seams in the final product and has no interlocking mating seams.

In the disclosed embodiment 10, a continuous feed process feeds a web or ribbon 12 of suitable belt material with mating seam edges at an angle to be spirally wound and seam-edge mated to form a cylinder by a tapered roll forming system. Laser cutting or cutting dies can form the opposing mating puzzle-cut edges of the web before or as the web is being fed to be spirally wrapped into a cylindrical roll. The puzzle-cut edges may be zipped or locked together as the material is being spirally wrapped. These puzzle-cut locking seams may then be additionally glued and/or filled at that stage, or later. Then, belt loops of a desired width may be sequentially cut off transversely from the moving cylinder of spiral interlocked web material, to provide the desired number of imagable belts.

This system allows belts to be produced in a more cost effective, automated, continuous (vs. batch) mode. Also, it reduces the potential for damage to the belts through excessive handling. Although this process provides more seam length per belt (with angled rather than perpendicular belt end-joining seams in each belt), that is not believed to be a problem where the seam is imagable (as opposed to synchronous imaging systems requiring seam-skipping). It may even provide more diffuse and less localized perturbations than a conventional perpendicularly transverse seam.

In the disclosed system there can be a continuous operation with the substrate web 12 fed either from a conventional roll supply or directly from a plastic extruder, into a pair of tapered rolls 26A, 26B. For a given diameter and taper, the rolls 26A, 26B will form the belt substrate into a cylindrical shape 30 of a fixed diameter. For the desired diameter of the cylinder 30, which in this system provides the desired circumference of the belt 14, the roll 26A, 26B diameters and tapers can be calculated by standard engineering techniques.

Prior to the web 12 entering the nip of the rolls 26A, 26B, a cutting station 20 with cutting lasers 22, 24 or a cutting die forms a puzzle cut on the opposite edges of the web 12. As the web 12 wraps around the rolls 24A, 26B the puzzle cuts on the adjacent web wrap wrap-align and fit into each other to form the seam 16.

Figure 1:
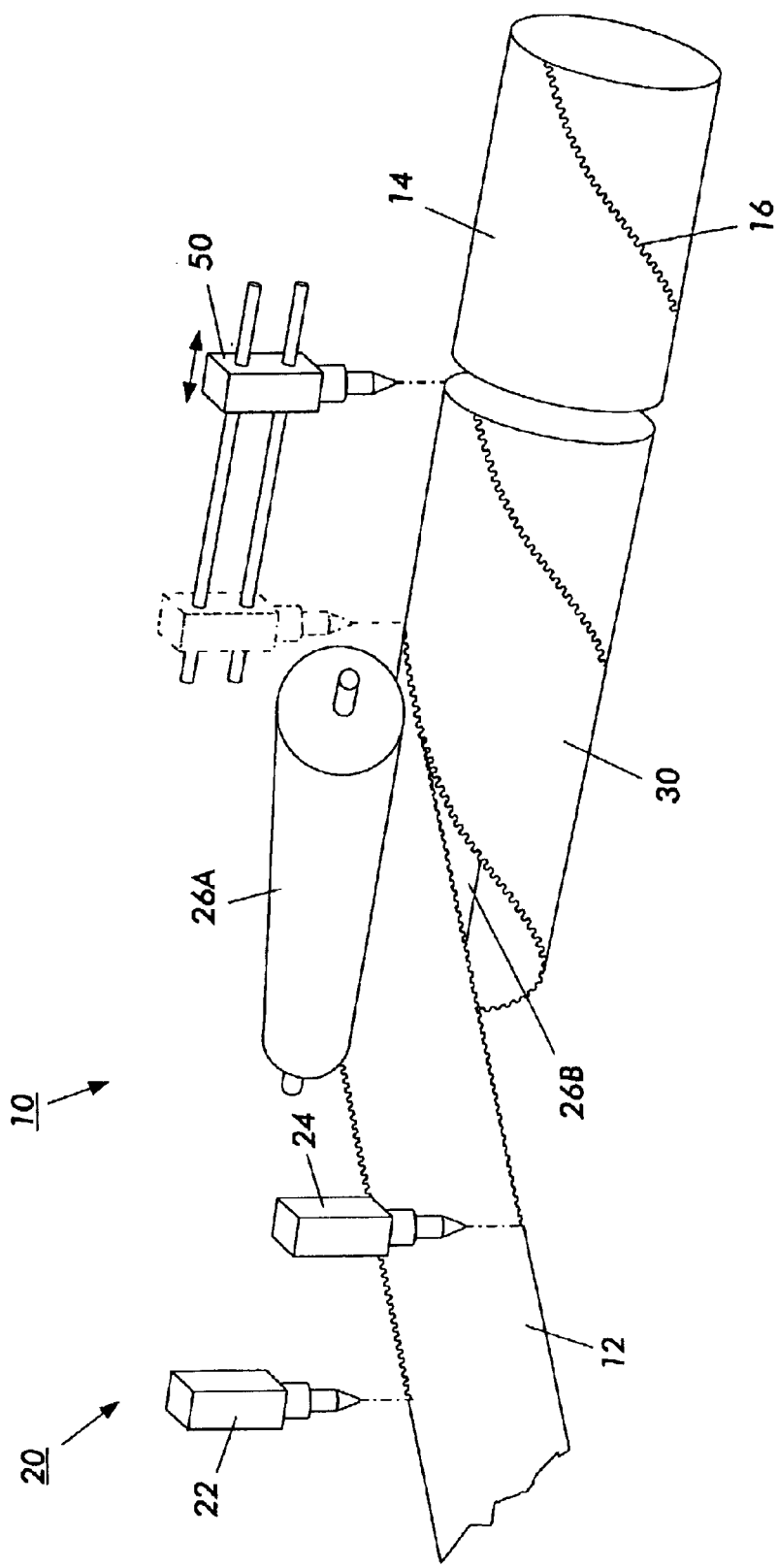
FIG. 1 is a schematic perspective view of one exemplary embodiment of a continuous manufacturing system for producing quantities of imageable seamed intermediate image transfer belts for xerographic printers.
Figure 2:
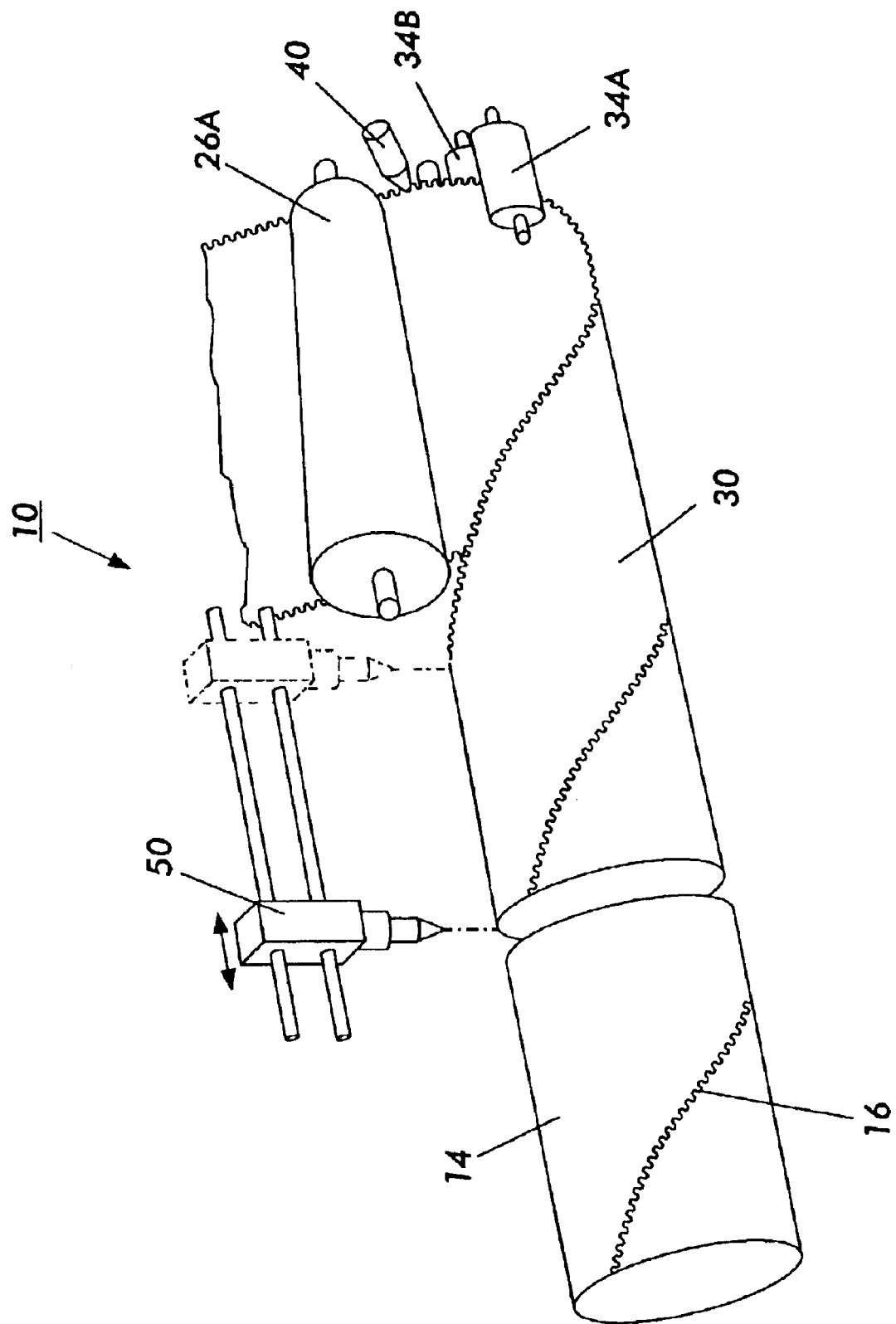
FIG. 2 is a rear view of the system of FIG. 1.

In FIG. 2 (a rear view of FIG. 1) there is schematically shown an exemplary gluing station 40 for the application of glue to the now-interlocked seam 16 area. That glue may then be then cured and smoothed or cleaned, for example as shown in FIG. 2, by a press rolls/wiper combination 34A, 34B.

As discussed in the above-cited issued patents, the glue may desirably have properties compatible with making the final seam 16 have electrical properties compatible with the rest of the belt 14, for making the seam area suitable for being compatibly imageable or toner image bearing with the rest of the belt.

The seam filler glue can be cured by a curing catalyst mix, ultraviolet, and/or with heat by adding heaters to the press rolls 34A, 34B. As the spiral formed and now seam-glued cylinder 30 further advances downstream along the axis of that cylinder, as new web is fed in from its upstream end, the individual endless belts 14 may be sequentially cut off downstream in appropriate selected belt widths. This may be by a variable position cutting laser 50 to provide for different final belt widths, or by a knife or other cutting device.

The upstream angled inserting of the web material 12 and its spiral wrapping in the tapered rolls 26A, 26B automatically forms the web material into a fixed diameter cylinder 30, of the desired circumference of the final belts, while the prior puzzle cutting 20 of the web 12 edges provides for the interlocked flat seaming of the final belts 14. However, it will be appreciated that the system 10 could alternatively provide belt seaming with a butt joint or overlapping seam.

Advantages of this process 10, in addition to automating fabrication, include the ability to produce a consistent diameter belt yet the ability to change belt diameters by changing the tapered roller instead of having to make a new cutting die, mandrel, or other changes.

The illustrated system 10 continuously moves a supply web 12 of the selected belt material through a series of automatic processes in a relatively linear moving assembly line fashion, to form finished seamed belts 14 at the end thereof. Each finished belt 14 has a puzzle-cut seam 16 as shown. A large number of seamed belts may be continuously automatically produced from a continuously fed web 12 and the puzzle-cutting may be done continuously along the edges of the supply web 12 as that supply web advances.

The two laser cutters 22 and 24 shown schematically in the puzzle-cutting station 20, may have respective small lateral movement systems to form the desired puzzle-cut pattern. Some examples of two axis (x-y) drive systems are shown in U.S. Pat. No. 3,670,426 FIGS. 5–8 or U.S. Pat. No. 4,954,913 FIG. 1. These respective movable lasers 22 and 24 (or alternative mirror beam steering systems for their laser beams), need only move their cutting laser beams transversely in and out by only the dimensions of the puzzle-cut tabs or fingers. Where the desired puzzle-cutting pattern forms the tabs with "undercuts" and enlarged heads, it will be appreciated that small coordinated movements of the cutting beam in the direction of movement of the web may also be desired. However, another method of laser cutting the respective mating belt seam tabs on each side of the web does not require any movement of the lasers. A fixed laser with beam-spreading optics may be used to cover an appropriate (2–5 sq. cm.) area of known quartz glass mirrored surface mask bearing the desired cutting pattern. The laser energy passes through the mask only in the pattern-etched areas of the mask. That mask pattern may consist of the shape of one or more of the desired tabs. The belt web material may be moved under this mask in a repeated step movement in a step distance corresponding to those same one or more tabs so as to cut each web edge into the desired continuous seam edge pattern. Laser cutting several tabs or seam nodes at a time in this manner with a plural tabs mask would be even faster and reduce the number of incremental stepping movements of the web. To increase the accuracy of the incremental stepping movement of the web, it may be overfed from the web roll into an accumulator or dancer roll loop, and/or fed with a unidirectional vacuum tractor web feeder from under the web. This may be done instead of, or in coordination with, incrementing a large feed roller transversely engaging the web 12 just downstream of the puzzle-cutting stations. Since this is conventional, it need not be illustrated.

After the opposing moving edges of the moving web 12 have been cut into mating puzzle cut patterns in the puzzle-cutting station 20, the moving web 12 here enters the tube forming system described above to wrap the web 12 into a cylinder 30 which has its axis extending in the process movement direction. The cylinder 30 of web material 12 is formed into the circumference of the intended finished seamed belts 14.

It will be appreciated that the here the rollers 26A, 26B can be much smaller in diameter than, and need not fully support, the web tube 30.

The opposing puzzle cut patterns on the opposing sides of the moving web 12 are overlapped and interdigitated (mated) together while being formed into the cylinder 30 by the rollers 26A, 26B, which locks them together in a seam 16, like closing a "zipper." As indicated above, a suitable liquid seam adhesive and seam filler material (as described in the cited references) may then be applied to the seam 16 by a glue dispensing system 40 and then UV lamp or otherwise cured. The seam 16 area may also then be ground, polished and/or coated as desired or described in the above-cited or other patents, then or later.

The formed web tube 30 moves on to the position of a laser cutter 50 (or cut-off saw) which intermittently operates at the desired times to sequentially cut off finished seamed belts 14 into their desired widths, thus forming finished seamed belts 14 with the size and fine seam quality control needed for belts with imageable seams.

Laser cutting per se is a well developed art, and the disclosed system is not limited to any particular type. The particular laser system type, energy density, and/or pulse repetition rates selected by those skilled in that art can vary with the particular belt material and thickness to be cut through with the laser beam and the cutting rate or speed, which will depend on the feeding rate of the web material here. It is believed that an ultraviolet (UV) laser frequency of about 248 nm will be suitable for cutting various belts of polyaniline and carbon black filled polyimide substrates as well as such belts having polyanaline and or zeloc filled polyimide films on those substrates. Excimer and triple frequency multiplied YAG lasers are believed to be capable of effectively producing such UV frequencies.

If desired, upstream of the subject puzzle-cutting operation the belt may be suitably overcoated, and/or suitable adhesives applied to edge areas, and or electrostatically corona treated, and dried, as desired. Downstream of this processing system 10 the seamed belts 14 may be subjected to further processing such as overcoatings, edge treatments and/or reinforcements, and automatic packaging. Those additional optional belt processing steps need be shown or described herein. Also, it will be appreciated that the above described operations of the system 10 could be performed vertically instead of horizontally, and that various known registration and/or laser alignment systems may be incorporated to locate and control the web position.

The adhesive used might even be a dry powder adhesive or a dry film adhesive, and the latter may be applied by a tape applicator, instead of a liquid adhesive applicator. Specifically, a selected seam-sealing material compatible with the belt material properties may be pre-applied to a conventional release liner tape. That tape may be inserted in a known tape dispenser automatically paying out that tape over the belt seam in the seam movement direction. Pressure and heat may be applied from behind the tape against the seam with, for example, a heated roller to flow that seam-sealing material off the tape into the seam, and the release liner tape may then be automatically stripped off.

While the embodiments disclosed herein are preferred, it will be appreciated from this teaching that various additional alternatives, modifications, variations or improvements therein may be made by those skilled in the art, which are intended to be encompassed by the following claims.

What is claimed is:

1. A method of manufacturing on a continuous basis quantities of seamed belts for printing systems from a continuous supply web of belt material of a given thickness, which seamed belts are manufactured to a desired predetermined defined circumference a desired predetermined defined width, comprising:

forming interlockable puzzle-cut seam-forming engagement edges on the opposing edges of said continuous supply web of belt material;

feeding said continuous supply web of belt material into a nip formed by a mating pair of rollers, at least one of rollers which is tapered, to spirally form said continuous web of belt material into a rotating cylinder with said web of belt material engaged edge to edge without overlapping, said rotating cylinder of said continuous web belt material having a circumference corresponding to said predetermined defined circumference of said seamed belts, said rotating cylinder of said continuous web belt material having a diameter substantially larger than that of either of said mating pair rollers, and said rotating cylinder of said continuous web belt material being automatically interlocked by mating interlocking engagement of said interlockable puzzle-cut seam-forming mating engagement edges to form a spiral seam; then adhesively sealing said interlocked puzzle-cut mating engagement edges to form a sealed said spiral seam while said web belt material is in said spirally formed rotating cylinder; and then sequentially transversely cutting off cylindrical segments of said spirally formed rotating cylinder of said belt material into a width corresponding to said desired predetermined defined width of said seamed belts;

to form said seamed belts with said desired predetermined defined circumference and said desired predetermined defined width and said given thickness with said seams being angular to said width of said seamed belts.

* * * * *